US006833652B2

(12) United States Patent
Jerman

(10) Patent No.: US 6,833,652 B2
(45) Date of Patent: Dec. 21, 2004

(54) BALANCED MICROMECHANICAL DEVICE HAVING TWO DEGREES OF MOTION

(75) Inventor: John H. Jerman, Palo Alto, CA (US)

(73) Assignee: Iolon, Inc., San Jose, CA (US)

( * ) Notice: Subject to any disclaimer, the term of this patent is extended or adjusted under 35 U.S.C. 154(b) by 0 days.

(21) Appl. No.: 09/938,871

(22) Filed: Aug. 24, 2001

(65) Prior Publication Data

US 2002/0067103 A1 Jun. 6, 2002

Related U.S. Application Data

(60) Provisional application No. 60/227,933, filed on Aug. 25, 2000.

(51) Int. Cl.[7] .................................................. H02N 1/00
(52) U.S. Cl. ........................................ 310/309; 385/18
(58) Field of Search ..................... 310/12, 309; 385/13, 385/16, 18; 360/294.5; 257/420; 359/223, 392

(56) References Cited

U.S. PATENT DOCUMENTS

| | | | |
|---|---|---|---|
| 5,375,033 A | 12/1994 | MacDonald | 361/281 |
| 5,536,988 A | 7/1996 | Zhang et al. | 310/309 |
| 5,631,514 A | 5/1997 | Garcia et al. | 310/309 |
| 5,963,367 A | 10/1999 | Aksyuk et al. | 359/392 |
| 5,998,906 A | 12/1999 | Jerman et al. | 310/309 |
| 6,175,170 B1 | 1/2001 | Kota et al. | 310/40 MM |
| 6,469,415 B2 * | 10/2002 | Jerman et al. | 310/309 |
| 2002/0067103 A1 * | 6/2002 | Jerman et al. | 310/309 |

FOREIGN PATENT DOCUMENTS

WO          WO 01/43268 A2     6/2001

OTHER PUBLICATIONS

Harness et al., "Spurious Mode Suppression in Electrostatic Comb Drive XY Microactuators", Microengineering, Modelling, and Design, IEE Seminar, Mar. 4, 1999.*
Motamedi et al., "On–chip Optical Processing", SPIE conference held in Austin, Texas on Microelectronic Structures and MEMS for Optical Processing as part of Micromachining and Microfabrication, Oct. 14–15, 1996, pp. 1–34.

* cited by examiner

Primary Examiner—Karl Tamai
(74) Attorney, Agent, or Firm—Dorsey & Whitney LLP

(57) ABSTRACT

A micromechanical device comprising a substrate, a movable member overlying the substrate, first and second microactuators carried by the substrate and a coupling assembly for connecting the first and second microactuators to the movable member. The first microactuator moves the movable member in a first substantially linear direction and the second microactuator moves the movable member in a second substantially linear direction substantially perpendicular to the first direction. The coupling assembly includes a first linkage coupled to the first microactuator and a second linkage coupled to the second microactuator. Each of the first and second linkage has a pivot for permitting the respective linkage to pivot when moving the movable member.

10 Claims, 3 Drawing Sheets

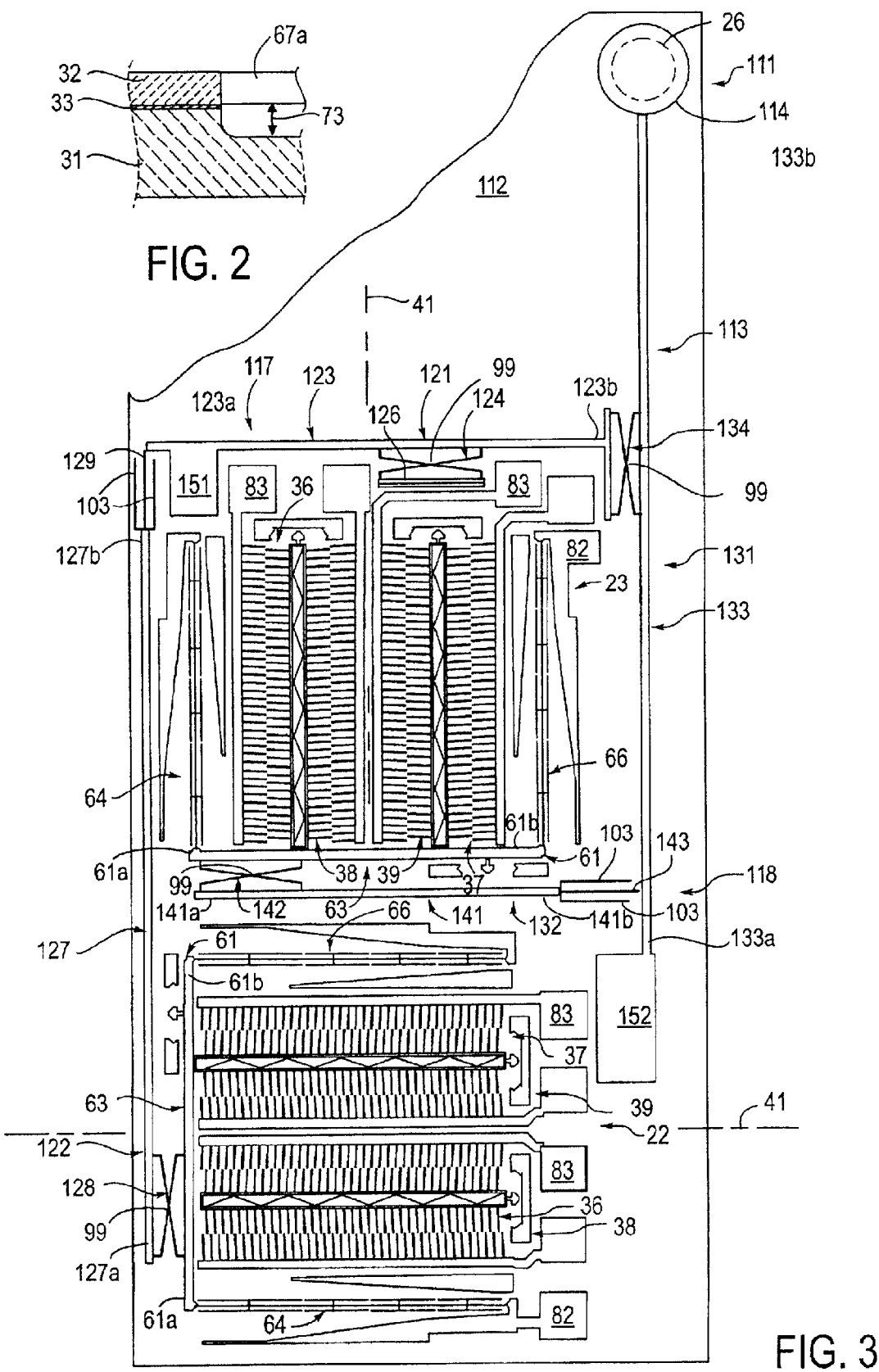

BALANCED MICROMECHANICAL DEVICE HAVING TWO DEGREES OF MOTION

CROSS-REFERENCE TO RELATED APPLICATION

The application claims priority to U.S. provisional patent application Ser. No. 60/227,933 filed Aug. 25, 2000, the entire content of which is incorporated herein by this reference.

SCOPE OF THE INVENTION

The present invention relates generally to microdevices and more particularly to micromechanical devices providing two degrees of motion.

BACKGROUND

Micromechanical devices have heretofore been disclosed that provide two degrees of motion. See, for example, U.S. Pat. Nos. 5,536,988 and 5,963,367 and the article "On-chip Processing" by Motamedi, Wu and Pister, SPIE Proceedings on Micromachining and Microfabrication, October 1966. Unfortunately, such devices are not suitable for providing large motions in first and second directions as movement of an element controlled thereby in a first direction can result in undesirable movements in the second direction. Furthermore, applied external accelerations can undesirably affect the performance of such devices by moving the parts controlled thereby. Balanced microdevices have been disclosed, but only for providing a single degree of motion. See, for example, International Publication Number WO 01/43268.

In general, it is an object of the present invention to provide a micromechanical device having first and second microactuators for providing two degrees of motion to a movable member.

Another object of the invention is to provide a micromechanical device of the above character in which undesirable motion of the movable member in the second degree of motion is minimized when the movable member is moved in the first degree of motion.

Another object of the invention is to provide a micromechanical device of the above character that is substantially mechanically balanced in the two degrees of motion.

SUMMARY OF THE INVENTION

The present invention provides a micromechanical device comprising a substrate, a movable member overlying the substrate, first and second microactuators carried by the substrate and a coupling assembly for connecting the first and second microactuators to the movable member. The first microactuator moves the movable member in a first substantially linear direction and the second microactuator moves the movable member in a second substantially linear direction substantially perpendicular to the first direction. The coupling assembly includes a first linkage coupled to the first microactuator and a second linkage coupled to the second microactuator. Each of the first and second linkage has a pivot for permitting the respective linkage to pivot when moving the movable member.

BRIEF DESCRIPTION OF THE DRAWINGS

The accompanying drawings, which are somewhat schematic in many instances and are incorporated in and form a part of this specification, illustrate several embodiments of the invention and, together with the description, serve to explain the principles of the invention.

FIG. 2 is a cross-sectional view of the micromechanical device of FIG. 1 taken along the line 2—2 of FIG. 1.

FIG. 3 is a plan view of another embodiment of a micromechanical device having two degrees of motion of the present invention in a first position.

DESCRIPTION OF THE INVENTION

Figure 1:
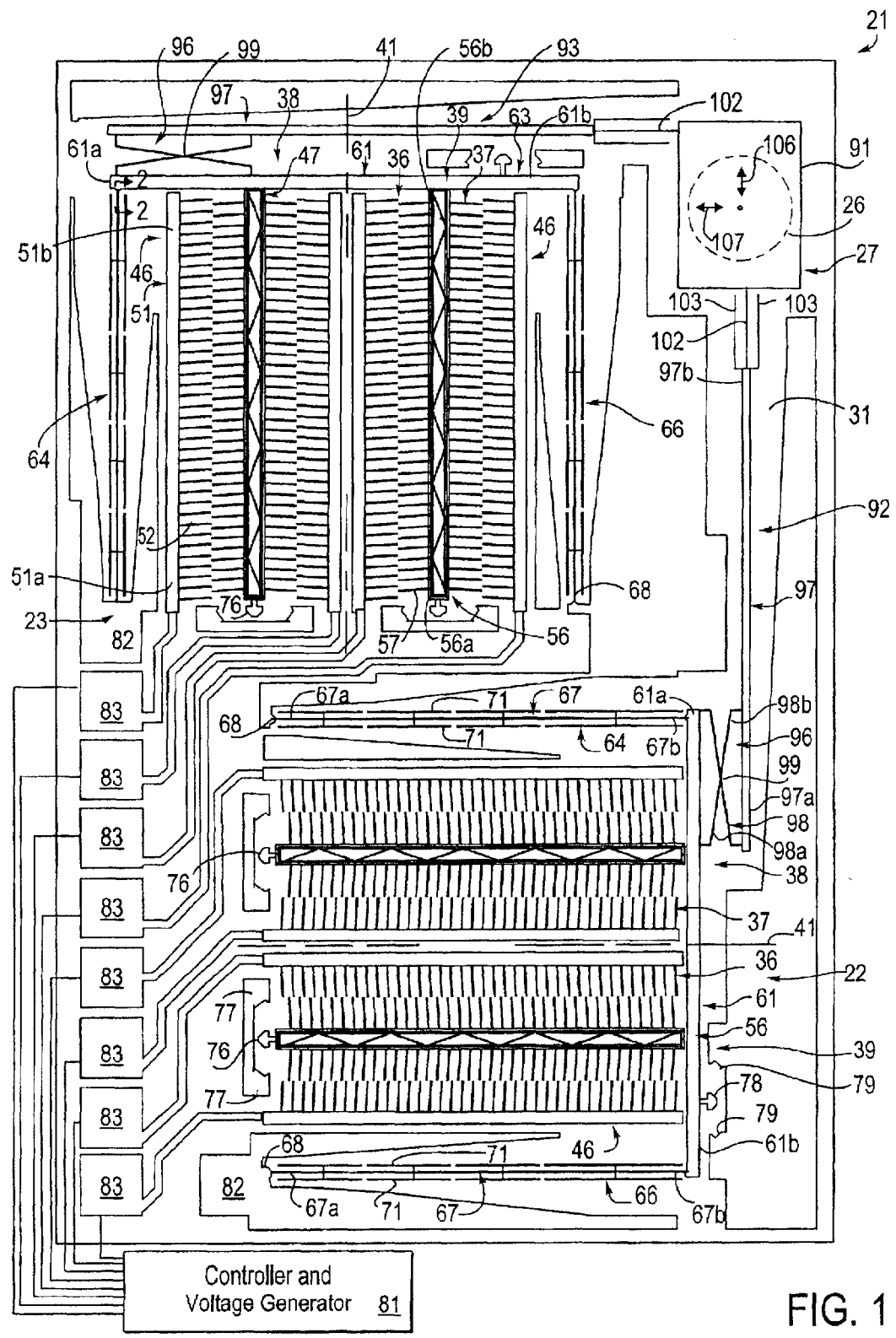
FIG. 1 is a plan view of a micromechanical device having two degrees of motion of the present invention.

The micromechanical device of the present invention can be in the form of a lens adjuster 21 suitable for use in a telecommunications system (see FIG. 1). In general, lens adjuster 21 includes first and second microactuators or motors 22 and 23, a movable member 26 and a coupling assembly 27. In the illustrated embodiment, the movable member 26 is a collimating lens.

First and second microactuators 22 and 23 can be of any suitable type, such as an electromagnetic microactuator or any other electrically-driven microactuator, but are preferably each an electrostatic microactuator. Although the microactuators 22 and 23 need not be identical, they are shown as being substantially similar in construction and similar to microactuators disclosed in U.S. patent application Ser. No. 09/547,698 filed Apr. 12, 2000 (Attorney Docket No. A-68187), the entire content of which is incorporated herein by this reference. In this regard, the microactuators 22 and 23 are formed on a planar substrate 31, preferably the same substrate, made from any suitable material such as silicon. Substrate 31 is preferably formed from a silicon wafer and has thickness ranging from 200 to 600 microns and preferably approximately 400 microns. First and second microactuators 22 and 23 are formed atop the substrate 31 by a second or top layer 32 made from a wafer of any suitable material such as silicon (see FIG. 2). Top layer or wafer 32 has a thickness ranging from 10 to 200 microns and preferably approximately 85 microns and is secured at certain points to the substrate 31 by any suitable means. In one preferred embodiment, top wafer 32 is fusion bonded to substrate 31 by a silicon dioxide layer 33 having a thickness ranging from 0.1 to two microns and preferably approximately one micron. Top wafer 32 may be lapped and polished to the desired thickness. The first and second microactuators are formed from top water 32 by any suitable means, and are preferably etched from the wafer 32 using deep reactive ion etching techniques so as to have a high degree of stiffness out of the plane of substrate 31.

Each of the first and second microactuators 22 and 23 includes at least one comb drive and preferably includes at least one first comb drive assembly 36 for moving lens 26 in a first direction and at least one comb drive assembly 37 for moving the lens 26 in an opposite second direction. In the preferred embodiment of lens adjuster 21 shown in FIG. 1, each microactuator 22 and 23 has first and second sets 38 and 39 of comb drive assemblies, each of which set has one first comb drive assembly 36 and one second comb drive assembly 37. The first and second sets 38 and 39 of comb drive assemblies extend parallel to each other and to the longitudinal axis 41 of the microactuator 22 or 23.

Each of the first and second comb drive assemblies 36 and 37 is substantially similar in construction and has a length ranging from 200 to 2000 microns and preferably approximately 800 microns. A first drive member or comb drive member 46 mounted on substrate 31 and a second drive member or comb drive member 47 overlying the substrate are provided for each of the comb drive assemblies 36 and 37. The first or stationary comb drive 46 of each of first and second comb drive assemblies 36 and 37 is immovably secured to substrate 31 and is formed from a longitudinally-extending truss or bar 51 having first and second end portions 51a and 51b. A plurality of first comb drive fingers or stationary comb fingers 52 extend from one side of bar 51 in longitudinally spaced-apart positions along the length of the bar. The second or movable comb drive 47 of each of first and second comb drive assemblies 36 and 37 is spaced above substrate 31 so as to be movable relative to the substrate and the respective stationary comb drive 46. The movable comb drives 47 have a construction similar to the stationary comb drives 46 and, more specifically, are each formed with a longitudinally-extending truss or bar 56 having first and second end portions 56a and 56b. A plurality of second comb drive fingers or movable comb fingers 57 extend from one side of bar 56 in longitudinally spaced-apart positions along the length of the bar.

The second or movable comb drive fingers 57 of each comb drive assembly face the first or stationary comb drive fingers 52 of the comb drive assembly. Stationary and movable comb drive fingers 52 and 57 are shown as being similar in construction and each have a length ranging from 15 to 150 microns and preferably approximately 60 microns. The movable comb drives 47 in each set 38 or 39 of comb drive assemblies share a movable bar 56. As such, the movable comb fingers 57 of the first comb drive assembly 36 in each set extend from one side of bar 56 and the movable comb drive fingers 57 of the second comb drive assembly 37 in each set extend from the other side of the bar 56.

The second end portions 56b of the movable bars 56 in first and second sets 38 and 39 are each rigidly attached to the central portion of a shuttle 61 provided with first and second end portions 61a and 61b. The substantially rigid shuttle 61 extends at an approximate right angle to longitudinal axis 41 of the microactuator and movable bars 56 extend perpendicularly from the shuttle 61 at longitudinally spaced-apart positions.

Shuttle 61 and the movable comb drives 47 of each of first and second comb drive assemblies 36 and 37 are part of a movable structure 63 of the respective microactuator 22 or 23. Such movable structure 63 is supported or suspended above substrate 31 by first and second spaced-apart springs 64 and 66. As such, first and second springs 64 and 66 are included within the means of the respective microactuator for supporting or suspending movable structure 63 over substrate 31. Springs 64 and 66 further provide linear stiffness along axis 41 to the movable comb drives 47 and movable structure 63. Each of the springs or suspensions 64 and 66 preferably has a length approximating the length of the first and second comb drive assemblies 36 and 37. Although the springs 64 and 66 can be of any suitable construction, each of the springs is preferably formed from an elongate beam-like member or flexural beam 67 having a first end portion 67a coupled to substrate 31 by an anchor 68 and a second end portion 67b joined to the respective first end portion 61a or second end portion 61b of shuttle 61 so as to be coupled to the movable comb drives of the microactuator. First and second thin, elongate sacrificial beams 71, each of a type described in U.S. Pat. No. 5,998,906, are provided for each flexural beam 67 to enhance even etching of the flexural beam and thus formation of the desired rectangular cross section of the flexural beam. Sacrificial beams 71 extend parallel to the respective flexural beam 67 and are spaced apart on opposite sides of the beam. Movable structure 63 and springs 64 and 66 are spaced above substrate 31 by an air gap 73, shown in FIG. 2, that ranges from one to 30 microns so as to be electrically isolated from the substrate 31. First and second comb drive assemblies 36 and 37 are preferably disposed between first and second springs 64 and 66, although at least some of the comb drive assemblies 36 and/or 37 can optionally be disposed outside of the springs 64 and 66 and be within the scope of the present invention.

Each second or movable comb drive 47 of comb drive assemblies 36 and 37 is movable relative to the respective first or stationary comb drive 46 from a first position shown in FIG. 1, in which comb fingers 52 and 57 are not substantially fully interdigitated, to a second position (not shown), in which the comb fingers 52 and 57 are substantially fully interdigitated. Movable comb fingers 57 are shown in FIG. 1 as being fully disengaged, and thus not partially interdigitated, when in their first position. Nonetheless, it should be appreciated that the movable comb fingers can be partially interdigitated with the respective stationary comb fingers when in their first position and be within the scope of the present invention. As used herein, substantially fully interdigitated includes positions when the first and second comb drive fingers 52 and 57 are more interdigitated then when not substantially fully interdigitated, and particularly includes positions when the comb drive fingers 52 and 57 are fully interdigitated. When in their second positions, the movable comb fingers 57 extend between the respective stationary comb fingers 52. The movable comb fingers 57 approach but preferably do not engage stationary bar 51 and, similarly, stationary comb fingers 52 approach but preferably do not engage movable bar 56 as a movable comb drive 47 moves to its second position. When the movable comb drives 47 of first comb drive assembly 36 move to their second position, the movable comb drives 47 of second comb drive assembly 37 move to a third position (not shown) in which the stationary and movable comb fingers 52 and 57 are fully disengaged and spaced apart a distance which can approximate the length of a comb finger 52 or 57.

As discussed above, first and second springs 64 and 66 permit the movement of movable comb drives 47, and thus shuttle 61 and the remainder of movable structure 63, relative to stationary comb drives 46 and substrate 31 and further provide longitudinal rigidity to movable structure 63 so as to inhibit snap over between interdigitated comb fingers 52 and 57. Shuttle 61 moves substantially perpendicular to longitudinal axis 41 and in a substantial linear direction as it moves between its first and second positions. A bumper 76 is provided on the first end position 56a of each movable bar 56 for engaging respective forward and rearward stops 77 formed on substrate 31 to limit the movement of shuttle 61 and the remainder of movable structure 63 and thus define the first and second positions of the shuttle and the movable structure. An additional bumper 78 is provided on the second end portion 61b of shuttle for similarly engaging forward and rearward stops 79 mounted on substrate 31.

Stationary and movable comb fingers 52 and 57 are preferably of the type disclosed in U.S. patent application Ser. No. 09/547,698 filed Apr. 12, 2000 and, as such, are inclined and offset. In general, each of the comb fingers is slightly inclined from a line extending normal to the respective bar 51 or 56. In addition, when movable comb drives 47 are in their first or rest position shown in FIG. 1, each of movable comb fingers 57 is offset relative to a midpoint line extending between the adjacent pair of stationary comb fingers 52 into which such movable comb finger 57 interdigitates. When the movable comb drives 47 move to their second positions, in which the movable comb fingers 57 interdigitate with the stationary comb fingers 52, each movable comb finger 57 becomes centered on such midpoint line. The inclination and offset of stationary and movable comb fingers 52 and 57 accommodate the foreshortening and deflection of springs 64 and 66 and the resulting movement of movable comb drives 47 along longitudinal axis 41 as movable structure 63 moves from its first position, in which springs 64 and 66 are in a straightened position as shown in FIG. 1, to its second position, in which springs 64 and 66 are bent or deflected (not shown).

Movement of second comb drives 47 of the first comb drive assemblies 36 to their respective second positions causes shuttle 61 to move substantially linearly in a first direction relative to substrate 31. Similarly, movement of second comb drives 47 of the second comb drive assemblies 37 to their respective second positions causes the shuttle 61 to move substantially linearly in an opposite direction relative to substrate 31. The forwardmost and rearwardmost positions of shuttle 61 are determined by stops 77 and 79. Shuttle 61 of first microactuator 22 moves forwardly and rearwardly in linear directions that are substantially perpendicular to the similar linear motion of shuttle 61 of second microactuator 23.

Electrical means is included for driving movable comb drives 47 of each microactuator 22 and 23 between their first and second positions. Such electrical means can include a controller and voltage generator 81 connected to a plurality of electrodes provided on substrate 31. Such electrodes include a ground or common electrode 82 electrically coupled to anchor 68 and thus movable comb drives 47 and one or more drive electrodes 83 coupled t, stationary comb drives 46. A metal layer (not shown) made from aluminum or any other suitable material is provided on the top surface of top wafer 32 for creating the electrodes and any leads relating thereto. Controller and voltage generator 81, typically not an integral part of lens adjuster 21, is electrically coupled by leads or other means to electrodes 82 and 83 and is shown schematically in FIG. 1.

Means in the form of a closed looped servo control can be included for monitoring the position of movable comb drives 47 and thus movable structure 63. For example, controller 81 can determine the position of movable comb drives 47 by means of a conventional algorithm included in the controller for measuring the capacitance between comb fingers 52 and 57. A signal separate from the drive signal to the comb drives 46 and 47 can be transmitted by controller 81 to microactuators 22 and 23 for measuring such capacitance. Such a method does not require physical contact between comb drive fingers 52 and 57. Alternatively, where microactuators 22 and 23 are used in an optical system, all or a portion of the output optical energy from lens adjuster 21 can be measured and the drive signals from the controller 81 to the microactuators 22 and 23 appropriately adjusted.

Lens 26 overlies substrate 31 and is coupled to first and second microactuators 22 and 23 by means of coupling assembly 27, which also overlies substrate 31. Coupling assembly 27 has a platform or holder 91 for carrying lens 26. A first linkage 92 couples holder 91 to first microactuator 22 and a second linkage 93 couples the holder 91 to second microactuator 23. First and second linkages 92 and 93, each of which extend in a direction substantially parallel to the linear direction of travel of the respective shuttle 61, are substantially identical in construction. In this regard, each of the linkages 92 and 93 has a first end portion coupled to the respective microactuator by means of a pivot assembly or hinge 96. More specifically, a lever member or lever 97 having first and second end portions 97a and 97b is included in each of the first and second linkages 92 and 93. Hinge 96 is joined to first end portion 97a of the lever. Substrate 31 preferably has a through hole (not shown) beneath lens 26 to permit the passage of light through the substrate.

Hinge 96 is X-shaped when viewed in plan, as shown in FIG. 1, and is provided with first and second pivot arms 98 which join at their center to form a pivot point 99. Each of the pivot arms has a first end portion 98a rigidly joined to first end portion 61 a of shuttle 61 and a second end portion 98b rigidly joined to the first end portion 97a of the lever 97. In this manner, hinge 96 is included within the linking means of the first or second linkage 92 or 93 for coupling the first end portion 97a of lever 97 to the respective microactuator 22 or 23. Each of the pivot arms 98 is capable of bending or flexing and preferably has a construction and purpose similar to flexural beams 67 of first and second springs 64 and 66. Second end portion 97b of lever 97 includes a flexural member 102, similar in construction to flexural beams 67, which serves to couple the lever 97 to holder 91. First and second sacrificial bars 103, each similar in construction to sacrificial bars 71 discussed above, extend alongside each of the opposite sides of the flexural member 102. Hinge 96 and lever 97 serve as a lever assembly for coupling the respective microactuator to holder 91.

In operation and use, holder 91 and thus lens 26 can be pivoted about pivot point 99 of second linkage 93 by means of first microactuator 22. Specifically, movement of second comb drives 47 of the first comb drive assemblies 36 of first microactuator 22 to their second or interdigitated positions causes the related shuttle 61 to move rearwardly and thus pull the holder 91 in a clockwise direction in FIG. 1. Similarly, movement of the second comb drives 47 of the second comb drive assemblies 37 of first microactuator 22 to their interdigitated positions causes shuttle 61 to move forwardly in a substantially linear direction and thus the push holder 91 in a counterclockwise direction about pivot point 99 of the second linkage 93. Suitable voltage potentials to drive electrodes 83 can range from 20 to 200 volts and preferably range from 70 to 140 volts. Since the angular displacements about the pivot point 99 are relatively small, such rearward and forward travel of holder 91, identified by reference numeral 106 in FIG. 1, resembles a shallow arc and is thus substantially linear.

Hinge 96 of the second linkage 93 permits lever arm 97 of the linkage 93 to so pivot about pivot point 99. Flexural member 102 of the second linkage 93 facilitates bending of at least a portion of the second linkage to accommodate such pivoting of lever 97 at hinge 96. As a result, substantially independent x and y motion of lens 26 is permitted.

In a manner similar to first microactuator 22, second microactuator 23 can be operated to pivot lever arm 97 of first linkage 92, and thus holder 91, about pivot point 99 of the first linkage 92 and thus move lens 26 in opposite first and second directions of travel, identified by reference numeral 107 in FIG. 1, that are substantially perpendicular to opposite directions of travel 106.

Shuttle 61 of each of the first and second microactuators 22 and 23 is capable of plus/minus linear travel of approximately 70 microns, for an aggregate travel between its forwardmost and rearwardmost positions of approximately 140 microns. Holder 91 moves the same amount as the driving shuttle 61, and rotates approximately 2.8 degrees for each 70 microns of linear movement of the driving shuttle. Simultaneous control of the x and y positions of holder 91 is permitted by first and second microactuators. It should be appreciated that other ranges of motion for holder 91 can be provided through the adjustment of the size and configuration of the components of lens adjuster 11.

Lens adjuster 11 is relatively compact in design. First and second microactuators 22 and 23 are disposed in juxtaposition and there is little unoccupied space on substrate 31. Holder 91 is advantageously disposed adjacent an exterior corner of the substrate.

Figure 4:
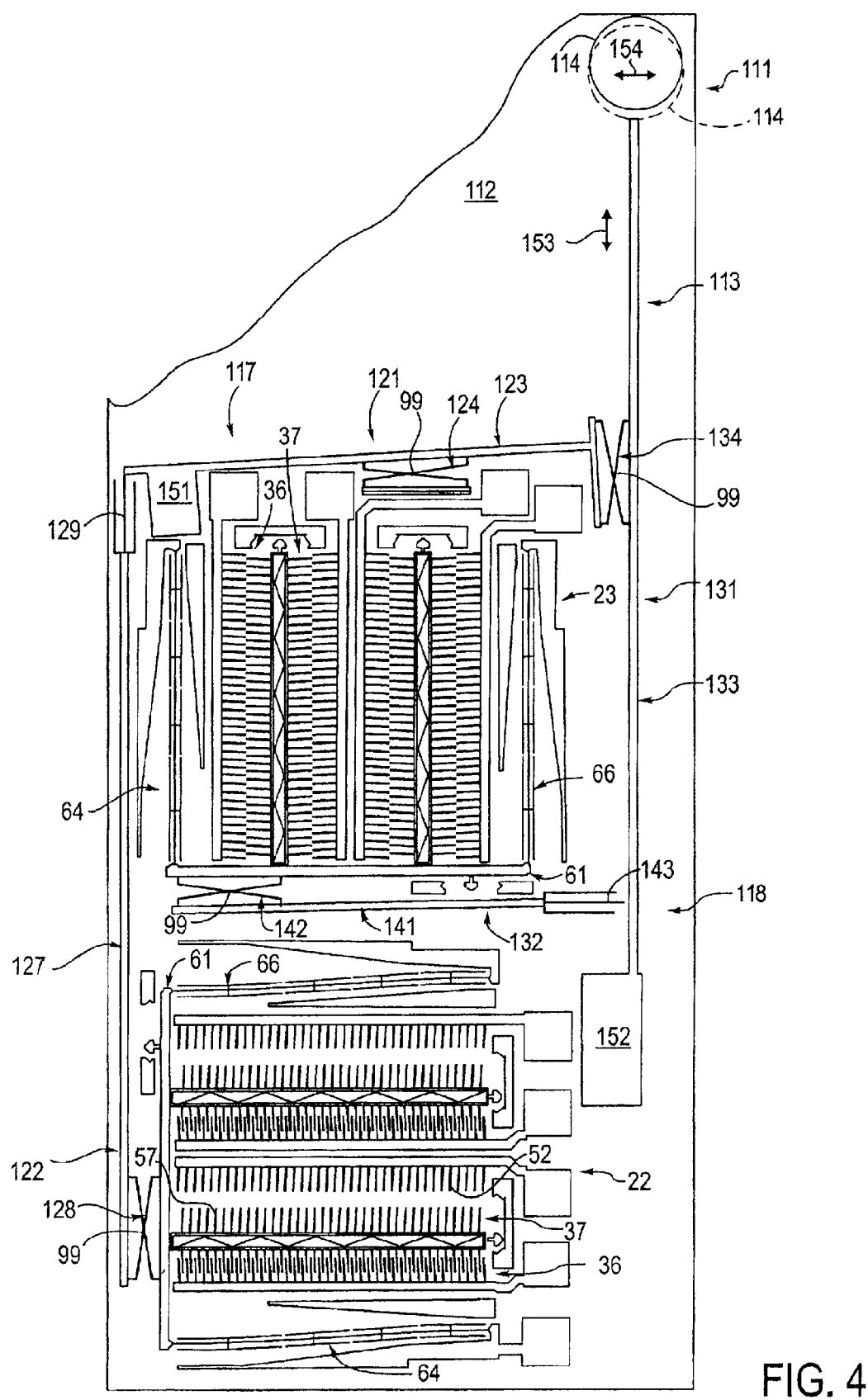
FIG. 4 is a plan view of the micromechanical device of FIG. 3 in a second position.

Other embodiments of the micromechanical device of the present invention can be provided. One embodiment of a micromechanical device having two degrees of motion that is mechanically balanced is shown in FIGS. 3 and 4. Micromechanical device 111 therein is substantially similar to device 21 and like reference numerals have been used to describe like components of devices 21 and 111. The device 111 includes a substrate 112 substantially similar to substrate 31. First and second microactuator 22 and 23 are formed on the top of substrate 112, in side-by-side disposition, from top wafer 32 in the manner discussed above. Lens 26 is coupled to the first and second microactuators by coupling assembly 113, which overlies the substrate 112 and includes a platform or holder 114 for carrying the lens 26. Lens 26 is shown, for simplicity, only in FIG. 3. Substrate 31 preferably has a through hole (not shown) beneath lens 26 to permit the passage of light through the substrate.

Coupling assembly 113 includes a first linkage 117 for coupling first microactuator 22 to holder 114 and a second linkage 118 for coupling second microactuator 23 to the holder 114. First linkage 117 has a first lever assembly 121 and an additionally first lever assembly 122. The first lever assembly includes a first lever member or lever 123 having first and second end portions 123a and 123b and a first pivot assembly or hinge 124 substantially similar to hinge 96 described above. The first end portions of each of the pivot arms of hinge 124 are joined in spaced-apart positions to an anchor 126 formed from top wafer 32 and rigidly secured to the substrate 31 by means by silicon dioxide layer 33. The second end portions of each of such pivot arms are joined in spaced-apart positions to the central portion of first lever 123.

Additional first lever assembly 122 includes an additional first lever member or lever 127 having first and second end portions 127a and 127b and an additional first pivot assembly or hinge 128 substantially similar to first hinge 96. Lever 127 is similar in construction to lever 97 and as such second end portion 127b thereof includes a flexural member 129 substantially similar to flexural member 102 described above. First and second sacrificial bars 103 extend alongside each side of flexural member 129. The first end portion of each of the pivot arms of hinge 128 is joined to first end portion 61a of the shuttle 61 of first microactuator 22. The second end portion of each of such pivot arms is joined to the first end portion 127a of lever 127. Flexural member 129 is joined at its distal end to first end portion 123a of first lever 123. Additional first lever assembly 122 is thus included within the first linking means of lens adjuster 111 for coupling first end portion 123a of first lever 123 to first microactuator 22. When first microactuator 22 is in its rest position, as shown in FIG. 3, first lever assembly 121, including first lever 123 thereof, extends substantially perpendicular to additional first lever assembly 122, including additional first lever 127 thereof.

Second linkage 118 is similar in construction to first linkage 117 and has a second lever assembly 131 and an additional second lever assembly 132. Second lever assembly 131 includes a second lever member or lever 133 having first and second end portions 133a and 133b and a second pivot assembly or hinge 134 substantially similar to first hinge 96. The first end portions of the pivot arms of second hinge 134 are joined in spaced-apart positions to second end portion 123b of first lever 123 of the first linkage 127. The second end portions of such pivot arms are joined in spaced-apart positions to the central portion of second lever 133. Second lever 133 extends substantially perpendicular to first lever 123 when first and second microactuators 22 and 23 are in their rest positions, as shown in FIG. 3, and second end portion 133b of the second lever is joined to holder 114. In this manner, second end portion 123b of the first lever is also coupled to holder 114 and lens 26 carried thereby.

Additional second lever assembly 132 is substantially identical to additional first lever assembly 122 and has an additional second lever member or lever 141 provided with first and second end portions 141a and 141b and an additional second pivot assembly or hinge 142. First end portion 141a of the additional second lever is joined to first end portion 61a of the shuttle 61 of second microactuator 23 by additional second hinge 142 in the manner discussed above with respect to additional first hinge 128. Second end portion 141b of the additional second lever includes a flexural member 143 substantially similar to flexural member 129 discussed above, which serves to connect such second end portion 141b to first end portion 133a of second lever 133. First and second sacrificial bars 103 extend alongside each side of the flexural member 143. When lens adjuster 111 is in its rest position, as shown in FIG. 3, second lever 133 extends perpendicular to first lever 123 of the first linkage 117 and to additional second lever 141 of the second linkage 118. Additional second lever assembly 132 is included within the second linking means of lens adjuster 111 which serves to couple second lever assembly 131 to second microactuator 23.

Each of the first and second microactuators 22 and 23 is mechanically balanced relative to lens 26. As discussed above, movements of the movable structure 63 of first actuator 22 along longitudinal axis 41 thereof are constrained by first and second springs 64 and 66. In addition, the net torque on first lever 123 about pivot point 99 of first hinge 124 is approximately zero, and thus balanced. Hence, movements of the movable structure 63 of first microactuator 22 and holder 114 in directions parallel or perpendicular to axis 41 of the microactuator 22 from applied accelerations, such as vibrations, to lens adjuster 111 are minimized. A first counterbalance 151 is optionally included in first linkage 117 for achieving such balancing. In this regard, first counterbalance or mass 151 is joined to first end portion 123a of the first lever 123 for achieving such balancing.

Second microactuator 23 is similarly balanced. Movements of the movable structure 63 of the second microactuator along longitudinal axis 41 thereof are constrained by first and second springs 64 and 66. In addition, the net torque on second lever 133 about pivot point 99 of second hinge 134 is approximately zero. Optional second counterbalance 152 is included within second linkage 118 and, in the illustrated embodiment, includes a mass joined to first end portion 133a of second lever 133.

Optional first and second counterbalances 151 and 152 are included in the at least one counterbalance of coupling assembly 113 or balancing means of lens adjuster 111. It should be appreciated that balancing can be achieved without a separate mass or counterbalance by adjusting the mass of the various movable components and the length of the various levers of lens adjuster 111 and by appropriately positioning the appropriate pivot point about which balancing is achieved.

In operation and use, lens adjuster 111 can be utilized in a manner similar to lens adjuster 21 for moving lens 26 in first and second substantially linear directions which are substantially perpendicular to each other. More specifically, movement of the second comb drives 47 of the first comb drive assemblies 36 of first actuator to their respective second positions result in the respective shuttle 61 moving rearwardly in a linear direction so as to pull additional first lever 127 rearwardly in such same linear direction. As shown in FIG. 4, first lever 123 is pivoted about first hinge 124 by such movement of lever 127 so as to move second lever 123 and holder 114 carried thereby in a linear direction opposite to the direction moved by shuttle 61. Additional second hinge 142 permits additional second lever 141 to pivot at the pivot point 99 of additional hinge 142 and flexural member 143 accommodates changes in the attachment angle of additional second lever 141 to second lever 133. The rest position of holder 114, that is the position shown in solid lines in FIG. 3, is shown in phantom lines in FIG. 4 to better illustrate the movement of the holder 114 resulting from the interdigitation of the movable and stationary comb fingers of first comb drive assemblies 36 of first microactuator 22. In a similar manner, interdigitation of the stationary and movable comb drive fingers of the second comb drive assemblies 37 of first microactuator 22 causes holder 114 and lens 26 carried thereby to move in an opposite linear direction and thus towards the first and second microactuators 22 and 23. The opposite directions of travel of lens 26 caused by first microactuator 22 are identified by reference numeral 153 in FIG. 4.

Second microactuator 23 operates in a similar manner to move lens 26 in third and fourth substantially linear directions which are substantially perpendicular to the directions of movement of lens 26 caused by first microactuator 22. In this regard, interdigitation of the stationary and movable comb fingers 52 and 57 of the first comb drive assemblies 36 of second microactuator 23 causes shuttle 61 of such microactuator to move rearwardly and thus pull additional second lever 141 and first end portion 133a of second lever 133 in such same linear direction. This causes the second lever 133 to pivot about the pivot point 99 of second hinge 134 and thus cause holder 114 to move substantially in an opposite linear direction from the direction of travel of the shuttle 61. In a similar manner, interdigitation of the stationary and movable comb fingers 52 and 57 of the second comb drive assemblies 37 of second microactuator 23 causes holder 114 to move in a linear direction that is opposite from the direction of travel caused by first comb drive assemblies 36. The opposite directions of travel of lens 26 caused by second microactuator 23 are identified by reference numeral 154 in FIG. 4. As discussed above with respect to lens adjuster 21, the relatively small angular rotation of second level, 133 about the pivot point 99 of second hinge 134, together with the substantially long length of the second lever 133, results in substantially linear travel of holder 114 and thus lens 26 in directions of travel 154.

Shuttles 61 of first and second microactuators 22 and 23 are each capable of plus/minus 70 microns of linear travel, for an aggregate travel between forwardmost and rearward positions of approximately 140 microns. Because of the lever ratio of first lever assembly 121, such 70 microns of movement of the shuttle of first microactuator 22 results in approximately 47 microns of parallel travel of holder 114. The lever ratio of second lever assembly 131 results in holder 114 moving approximately 62 microns of travel for such 70 microns of movement of the shuttle of second microactuator.

The mechanical balancing of lens adjuster 111 about pivot point 99 of first hinge 124 and about pivot point 99 of second hinge 134, that is the balanced torque at such pivot points, inhibits undesirable movement of lens 26 in such linear directions when unwanted accelerations are applied externally to the adjuster 111. As a result, undesired movements of lens 26 from a selected position are inhibited during operation of lens adjuster 111. The pivot points 99 of first and second hinges 124 and 134 are optionally disposed along an imaginary line extending parallel to directions of travel 154 so that the net torque on second lever assembly 131 at the pivot point 99 of first hinge 124 is also zero. As discussed above, first hinge 124 is coupled to substrate 112 by means of anchor 126.

Lens adjuster 111, like lens adjuster 21, has a relatively compact design. Holder 114 and lens 26 carried thereby are advantageously placed at an exterior corner of substrate 112. Although lens adjuster 111 has been described as having a through hole in substrate 112 below holder 114 to permit the passage of light to or from lens 26, lens 26 can alternatively be cantilevered over the side of substrate 112.

Movable member 26 has been described as an optical element and preferably a lens, but it should be appreciated that any other element can be carried by holder 91 and thus moved by micromechanical device 21. Other optical elements that are suitable as movable members 26 are optical filters, prisms and optical attenuators. In addition, the micromechanical device having two degrees of motion of the present invention can use rotatable microactuators in a manner similar to that described above for linear microactuators to provide two degrees of motion to a movable member.

As can be seen from the foregoing, a micromechanical device having first and second microactuators for providing two degrees of motion to a movable member has been provided. Undesirable motion of the movable member in the second degree of motion is inhibited when the movable member is moved in the first degree of motion. The device can be substantially mechanically balanced in the two degrees of motion.

What is claimed is:

1. A micromechanical device comprising a substrate, a movable member overlying the substrate, first and second microactuators carried by the substrate and a coupling assembly for connecting the first and second microactuators to the movable member, the first microactuator moving the movable member in a first substantially linear direction and the second microactuator moving the movable member in a second substantially linear direction substantially perpendicular to the first direction, the coupling assembly including at least one counterbalance for inhibiting undesirable movement of the movable member in the first and second directions in response to externally applied accelerations to the device.

2. A device as in claim 1 wherein the coupling assembly includes a first linkage coupled to the first microactuator and a second linkage coupled the second microactuator, the first linkage having a first counterbalance for inhibiting undesirable movement of the movable member in the first direction in response to externally applied accelerations to the device and the second linkage having a second counterbalance for inhibiting undesirable movement of the movable member in the second direction in response to externally applied accelerations to the device.

3. A device as in claim 2 wherein the first linkage is provided with a first lever assembly having a first lever member coupled to a first pivot assembly, the first lever member having first and second end portions, the second end portion being coupled to the movable member and first linking means for coupling the first end portion to the first microactuator.

4. A device as in claim 3 wherein the first linking means has a additional first pivot assembly coupled to the first microactuator and an additional first lever member coupled to the additional first pivot assembly.

5. A device as in claim 4 wherein the first linking means has a first flexural member for coupling the additional first lever member to the first end portion of the first lever member.

6. A device as in claim 3 wherein the second linkage is provided with a second lever assembly having a second lever member coupled to a second pivot assembly, the second lever member having first and second end portions, the second end portion being coupled to the movable member and second linking means for coupling the first end portion to the second microactuator.

7. A device as in claim 6 wherein the second linking means has an additional second pivot assembly coupled to the second microactuator and an additional second lever member coupled to the additional second pivot assembly.

8. A device as in claim 7 wherein the second linking means has a second flexural member for coupling the additional second lever member to the first end portion of the second lever member.

9. A device as in claim 6 wherein the first pivot assembly is coupled between the first lever member and the substrate.

10. A device as in claim 9 wherein the second pivot assembly is coupled between the second lever member and the first lever member.

* * * * *